(12) United States Patent
Lin (10) Patent No.: US 8,091,195 B2
(45) Date of Patent: Jan. 10, 2012

(54) TRIGGER DEVICE FOR A RIVET GUN AND A RIVET GUN HANDLE ASSEMBLY WITH A TRIGGER DEVICE

(76) Inventor: Yu-Ching Lin, Xizhi (TW)

( * ) Notice: Subject to any disclaimer, the term of this patent is extended or adjusted under 35 U.S.C. 154(b) by 653 days.

(21) Appl. No.: 12/244,922

(22) Filed: Oct. 3, 2008

(65) Prior Publication Data

US 2010/0084593 A1 Apr. 8, 2010

(51) Int. Cl.
*B23P 11/00* (2006.01)
(52) U.S. Cl. ............ 29/243.525; 29/243.523; 72/453.17
(58) Field of Classification Search ............ 29/243.523–243.525; 227/14, 51, 156, 130, 93.5; 72/453.17, 72/453.16
See application file for complete search history.

(56) References Cited

U.S. PATENT DOCUMENTS

| 4,509,668 | A * | 4/1985 | Klaus et al. ........................ 227/8 |
| 6,907,648 | B2 * | 6/2005 | Eldessouky ............... 29/243.525 |
| 7,082,658 | B1 * | 8/2006 | Lin ........................... 29/243.525 |
| 7,225,961 | B1 * | 6/2007 | Lee ................................. 227/130 |
| 7,475,800 | B2 * | 1/2009 | Liang ............................ 227/130 |

* cited by examiner

*Primary Examiner* — Dana Ross
*Assistant Examiner* — Matthew G Katcoff
(74) *Attorney, Agent, or Firm* — Pearne & Gordon LLP (57) ABSTRACT

A trigger device is mounted on a rivet gun. The rivet gun has a barrel, a handle and a pneumatic cylinder. The trigger device has an inlet channel defined in the handle, an outlet hole defined through the handle and communicating with the barrel, a valve-driving channel defined in the handle and communicating with the pneumatic cylinder, a space defined in the handle and communicating with the inlet channel, outlet channel and valve-driving channel. A trigger member is mounted on the handle. A two-step pressing assembly is mounted in the space and may be activated to control the rivet gun to eject a core pin of a used rivet or rivet pieces with an unused rivet. High-pressure air from an air source connected to the rivet gun is output only during the ejection operation of the rivet gun to prevent unnecessary air consumption and noise.

7 Claims, 14 Drawing Sheets

TRIGGER DEVICE FOR A RIVET GUN AND A RIVET GUN HANDLE ASSEMBLY WITH A TRIGGER DEVICE

BACKGROUND OF THE INVENTION

1. Field of the Invention

The present invention relates to a trigger device, and more particularly to a trigger device for a rivet gun that may be pulled and triggered in two steps. Pulling the trigger device to a first step activates the high-pressure airflow through the rivet gun to eject and discard a remaining core pin of a used rivet out of the rivet gun. Further pressing the trigger device to a second step stops the air flow and drives the rivet gun to pull a core pin of an unused rivet on the front end of the barrel of the rivet gun to finish a riveting operation.

2. Description of Related Art

Taiwan utility model patent applications No. M286081 and M272598 disclose conventional rivet guns for mounting rivets on at least two pieces so that the rivets securely hold the pieces together. A rivet has a cap and a core pin. The cap is T-shaped and has an enlarged end and a mounting end. The core pin is mounted longitudinally through, protrudes out of the cap and has two ends and a ball formed on one end and adjacent to the mounting end of the cap.

A conventional rivet gun comprises a barrel, a handle, a trigger, a pin collector and a valve member.

The barrel has a front end, a rear end and a vise assembly that may vise and pull a core pin of a rivet on the front end into the barrel. The handle is mounted perpendicularly on the barrel and has air passageways. The collector is a jar mounted on the rear end of the barrel to collect the ejected core pins. The pneumatic cylinder is mounted movably under the handle and capable of activating the vise assembly through pneumatic and hydraulic means. Furthermore, the pneumatic cylinder may be connected to a high-pressure air source such as an air bottle to implement the ejection of the core pin.

When the rivet gun is used to rivet two pieces such as boards or plates together, a rivet is mounted through the pieces. The enlarged end of the cap of the rivet abuts an inside piece and the front end of the barrel of the rivet gun abuts the enlarged end. The trigger is pulled to activate the vise assembly to pull a core pin on the cap into the barrel. The ball on the core pin longitudinally compresses and radially expands the mounting end of the cap into T-shape so that the expanded mounting end hooks on an outside piece to complete the riveting process. Then, the air output by the high-pressure air source flows through the barrel from the front end to the rear end and sucks the broken core pin vised by the vise assembly backward into the collector However, when the external high-pressure air source is connected to the rivet gun, the high-pressure air source constantly outputs air into the rivet gun no matter whether the rivet gun is triggered or not. The high-pressure air source cannot selectively output air during the core pin ejected when the broken core pin is ejected and stop outputting during the vise assembly vising and pulling the core pin.

To overcome the shortcomings, the present invention provides a trigger device for a rivet gun to mitigate or obviate the aforementioned problems.

SUMMARY OF THE INVENTION

The main objective of the invention is to provide trigger device for a rivet gun that that may be pulled and triggered in two steps. Pulling the trigger device to a first step activates the high-pressure airflow through the rivet gun to eject and discard a remaining core pin of a used rivet out of the rivet gun. Further pressing the trigger device to a second step stops the air flow and drives the rivet gun to pull a core pin of an unused rivet on the front end of the barrel of the rivet gun to finish a riveting operation.

A trigger device in accordance with the present invention is mounted on a rivet gun. The rivet gun has a barrel, a handle and a pneumatic cylinder. The trigger device has an inlet channel defined in the handle, an outlet hole defined through the handle and communicating with the barrel, a valve-driving channel defined in the handle and communicating with the pneumatic cylinder, a space defined in the handle and communicating with the inlet channel, outlet channel and valve-driving channel. A trigger member is mounted on the handle. A two-step pressing assembly is mounted in the space and may be activated to control the rivet gun to eject a core pin of a used rivet or rivet pieces with an unused rivet. High-pressure air from an air source connected to the rivet gun is output only during the ejection operation of the rivet gun to prevent unnecessary air consumption and noise.

Other objectives, advantages and novel features of the invention will become more apparent from the following detailed description when taken in conjunction with the accompanying drawings.

DETAILED DESCRIPTION OF THE PREFERRED EMBODIMENT

Figure 1A:
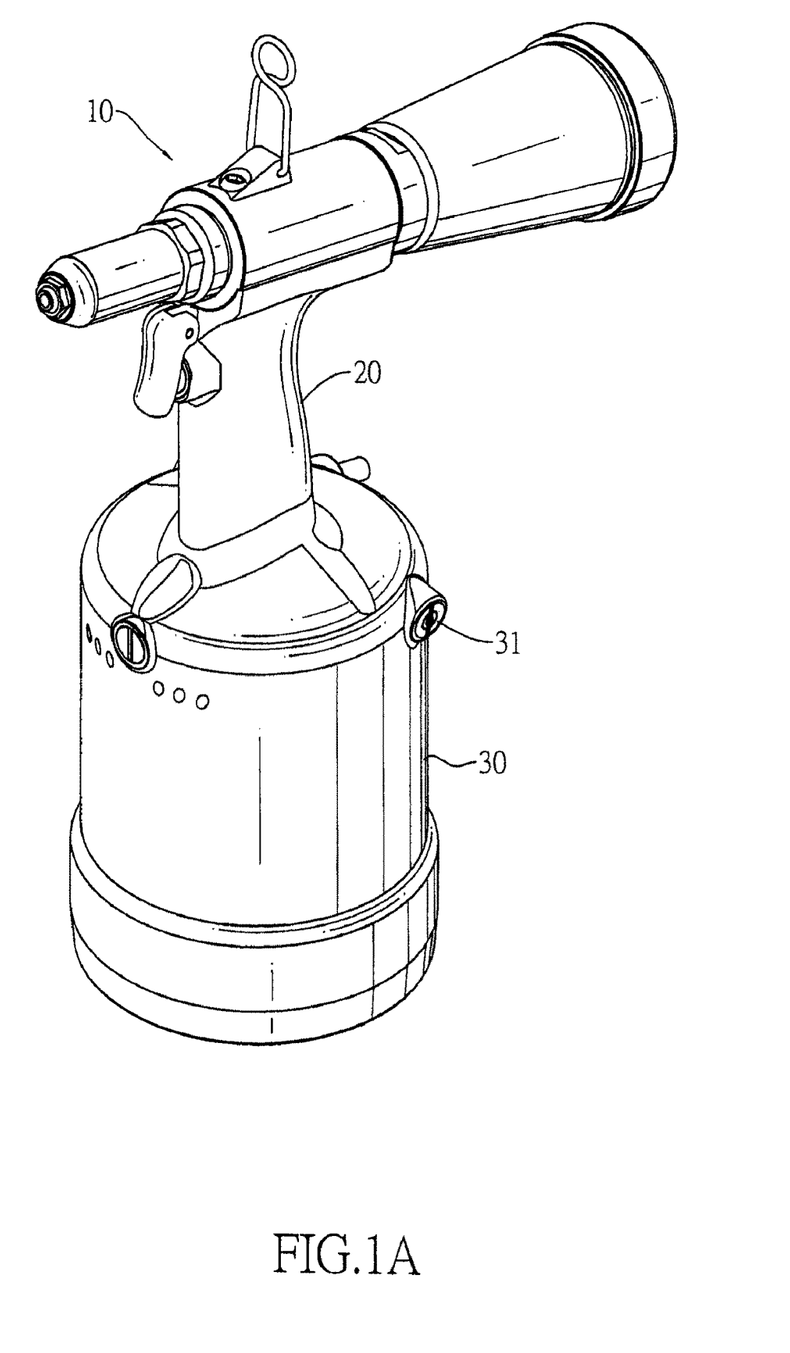
FIG. 1A is a perspective view of a trigger device in accordance with the present invention mounted on a rivet gun, wherein the rivet gun is connected to a pneumatic cylinder.
Figure 1B:
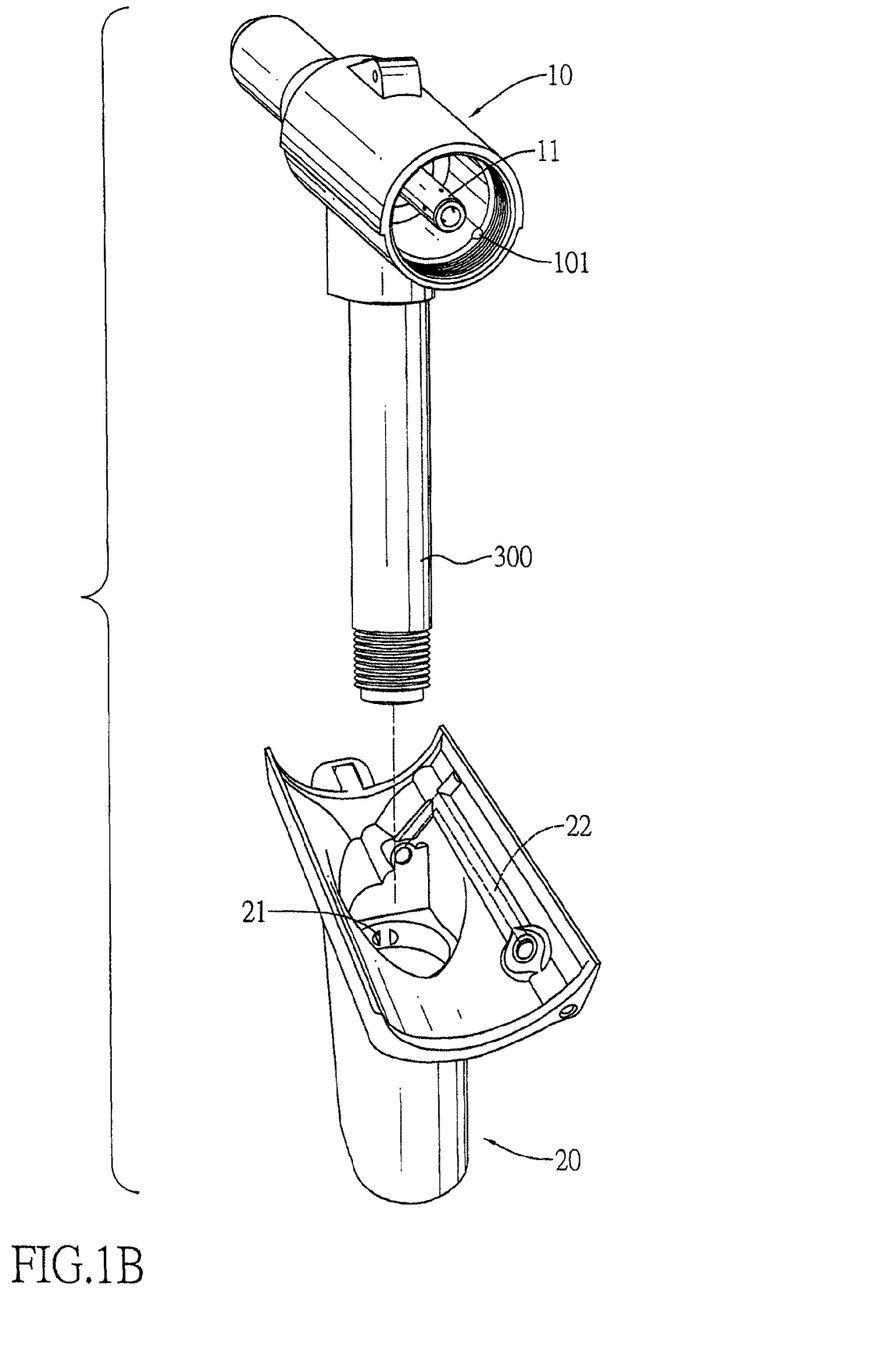
FIG. 1B is a partially exploded perspective view of the rivet gun in FIG. 1A.
Figure 2A:
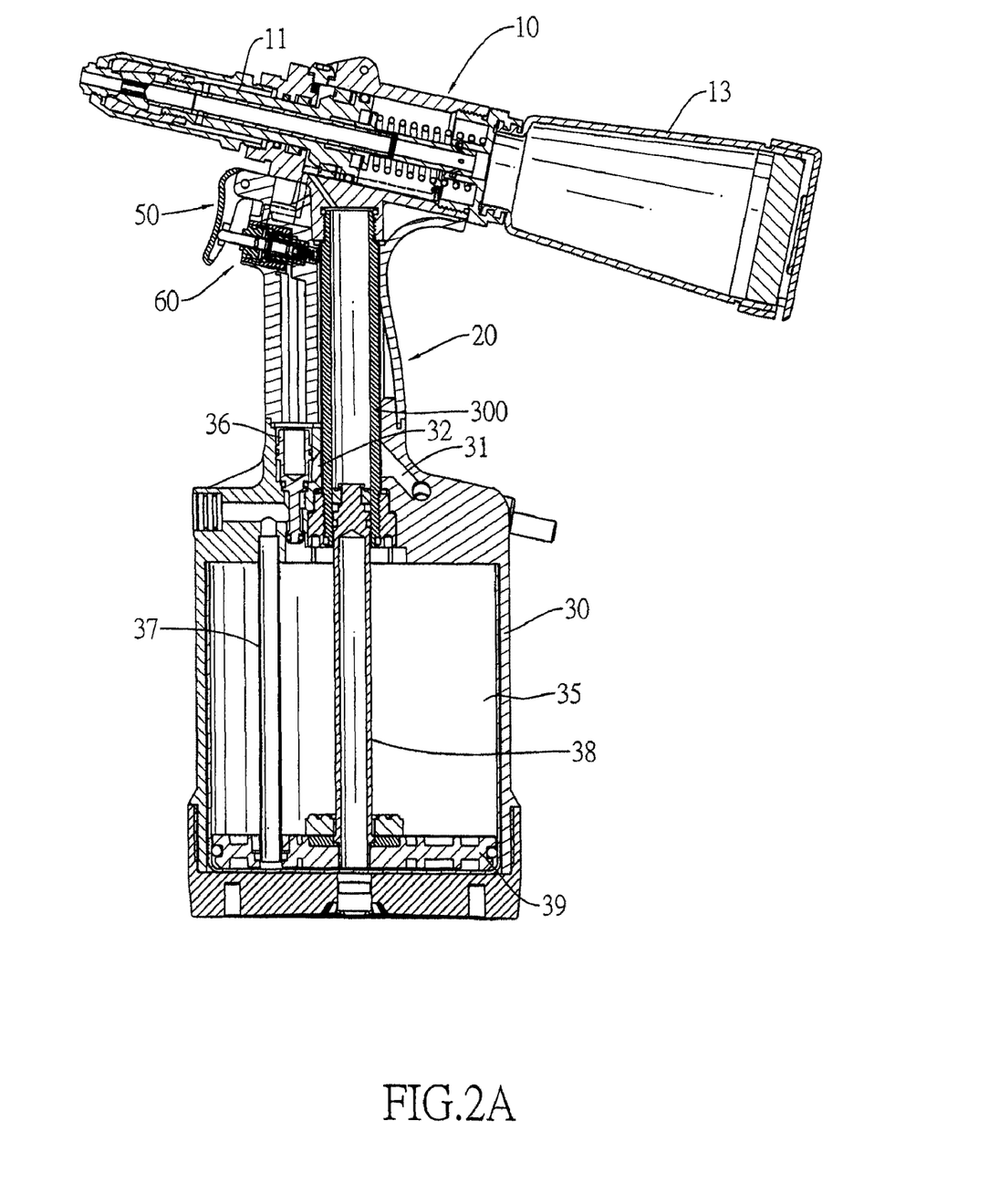
FIG. 2A is a cross sectional side view of the rivet gun in FIG. 1 with the trigger device and pneumatic cylinder, wherein the trigger device is not triggered.

With reference to FIGS. 1A, 1B and 2A, a trigger device in accordance with the present invention is mounted in a rivet gun in accordance with the present invention. The rivet gun may rivet pieces together through a rivet that has a cap and a core pin. The cap is T-shaped and has an enlarged end and a mounting end. The core pin is mounted longitudinally through, protrudes out of the cap and has two ends and a ball formed on one end and adjacent to the mounting end of the cap.

Figure 2B:
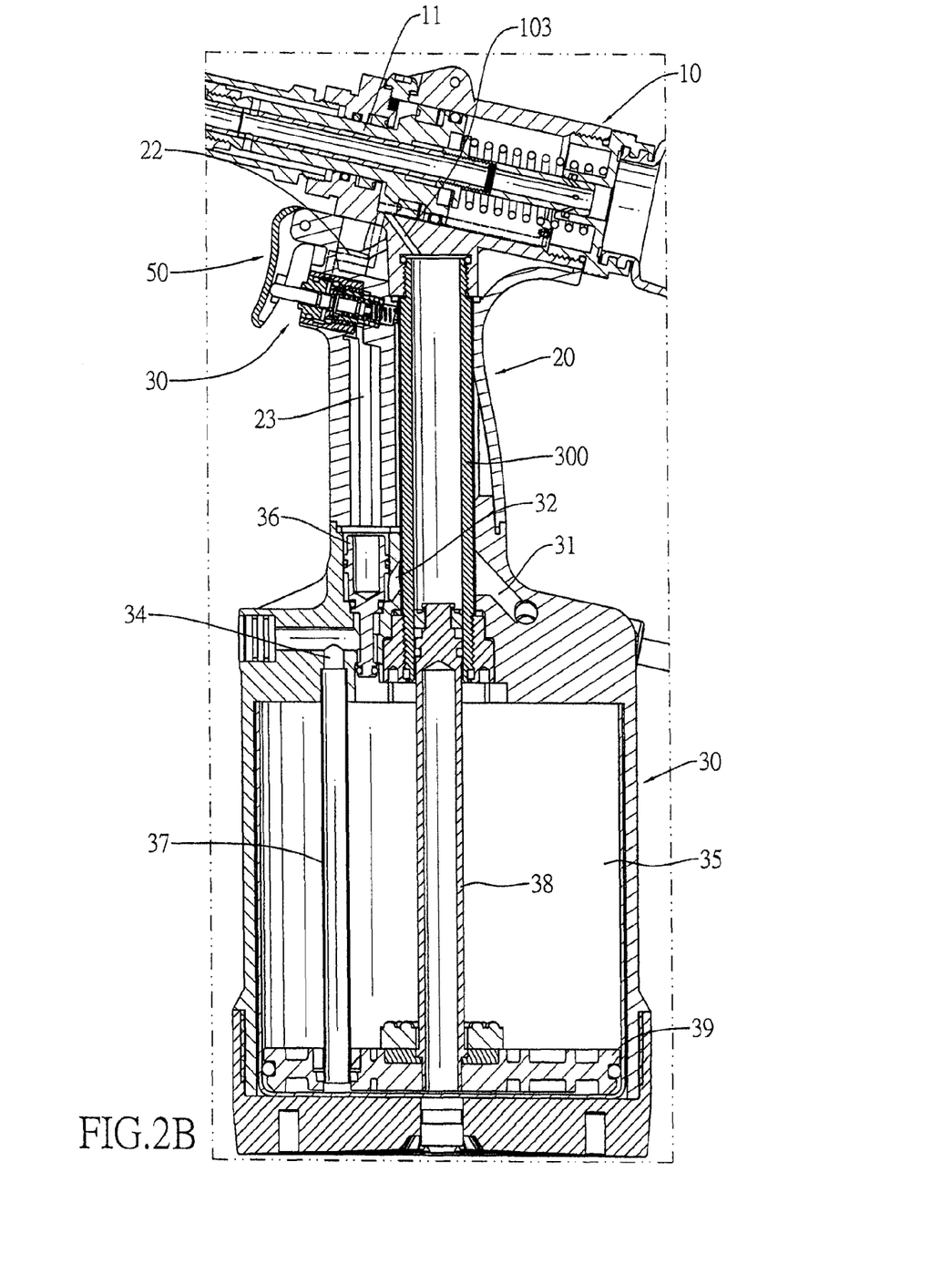
FIG. 2B is an enlarged cross sectional side view of FIG. 2A.
Figure 2C:
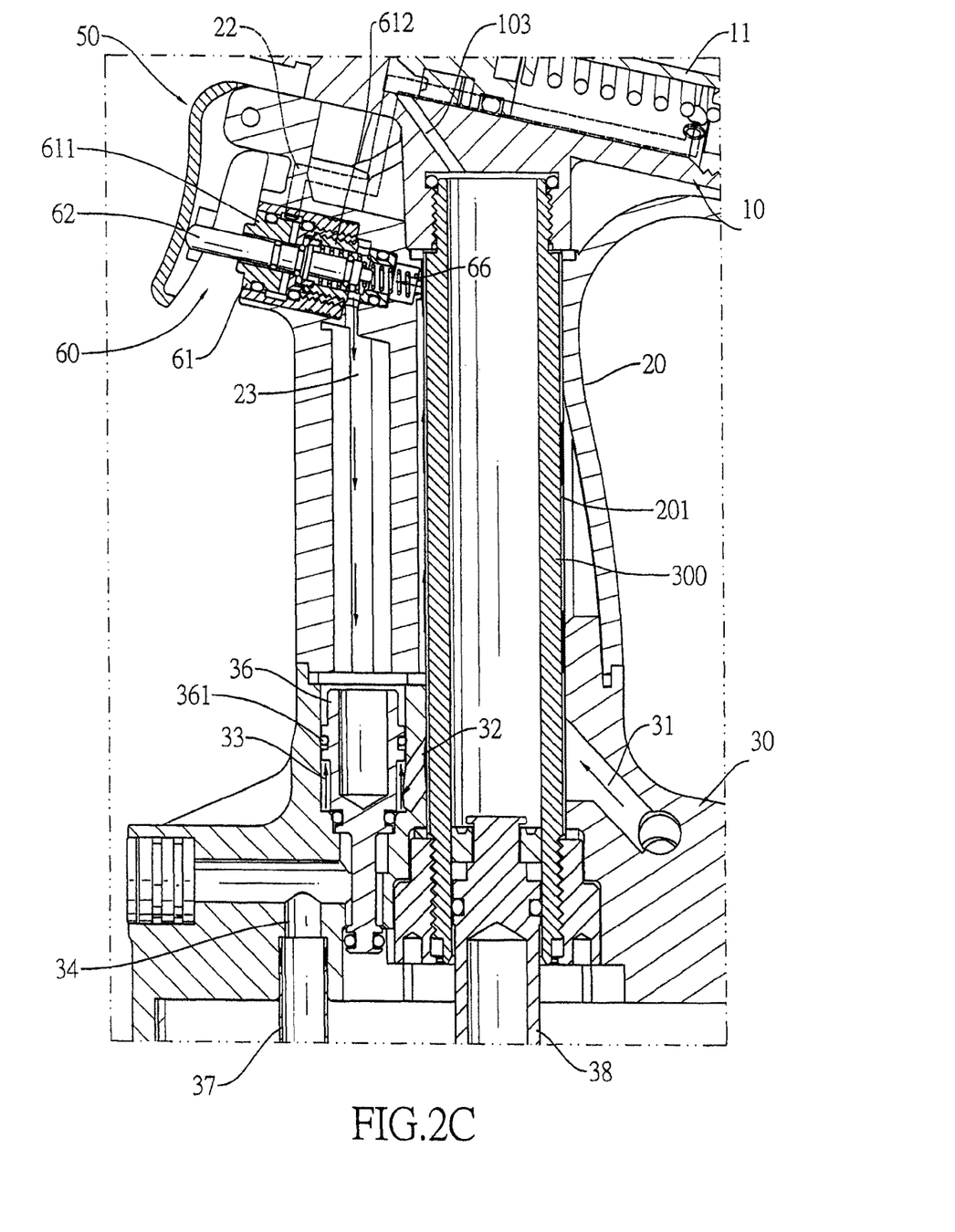
FIG. 2C is a further enlarged cross sectional side view aimed at the handle in FIG. 2B.

With further reference to FIGS. 2B and 2C, the rivet gun comprises a barrel (10), a handle (20) and a pneumatic cylinder (30)

The barrel (10) is hollow and has a through hole, an outlet hole (101), a hydraulic passageway (103), a vise assembly (11) and a collector (13). The through hole is defined axially through the barrel (10). The outlet hole (101) is defined transversely through the barrel (10) and communicates with the through hole. The hydraulic passageway (103) is defined through the bottom of the barrel (10) and communicates with the through hole. The vise assembly (11) is mounted in the through hole and has a front end, a rear end, a bottom, two vises and a tube. The vises are mounted on the front end. The tube is mounted on the rear end and has multiple transverse holes defined radially through the tube. The collector (13) is a jar, is mounted on the rear end of the barrel (10) and may receive core pins pulled and separated from used rivets.

The handle (20) is mounted perpendicularly on the bottom of the barrel (10) and has a top end, a bottom end and a central hole (201). The central hole (201) is defined through the handle (20).

The pneumatic cylinder (30) is mounted on the bottom end of the handle (20) and has a top, a bottom, a central aperture, an inlet passageway (31), a bypass passageway (32), an internal cavity (33), a lower passageway (34), a chamber (35), a control valve (36), a hydraulic tube (300), a piston (38), a head disk (39) and a pipe (37).

The central aperture is defined in the top, is aligned and communicates with the central hole (201) of the handle (20).

The inlet passageway (31) is defined through and communicates with the central aperture and ambient environment.

The bypass passageway (32) is defined in the pneumatic cylinder (30) and communicates with the central aperture.

The internal cavity (33) is defined in the top of the pneumatic cylinder (30), communicates with the bypass passageway (32) and has an inner surface.

The lower passageway (34) is defined in the pneumatic cylinder (30) and communicates with the internal cavity (33).

The chamber (35) is defined in the pneumatic cylinder (30), communicates with the lower passageway (34) and has an inner surface.

The control valve (36) is longitudinal, is mounted slidably in the internal cavity (33) and selectively hermetically isolates the internal cavity (33) from the lower passageway (34). The control valve (36) has a sealing ring (361) mounted around the control valve (36), hermetically contacting the inner surface of the internal cavity (33) and dividing the internal cavity (33) into an upper cavity and a lower cavity.

The hydraulic tube (300) is hollow, is mounted in the central hole (201) and the central aperture, communicates with the hydraulic passageway (103) and may receive liquid such as water or oil. An annular interval is defined between the hydraulic tube (300), the central hole (201) and the central aperture due to diameter difference between the hydraulic tube (300) and the central hole (201) and the central aperture.

The piston (38) is mounted hermetically and slidably in the hydraulic tube (300) and extends into the chamber (35). Moving up the piston (38) squeezes the liquid from the hydraulic tube (300) through the hydraulic passageway (103) into the barrel (10) to drive the vise assembly (11) to pull the core pin backward.

The head disk (39) is mounted securely on the piston (38), is mounted slidably in the chamber (35), hermetically contacts the inner surface of the chamber (35) and divides the chamber (35) into an upper chamber and a lower chamber.

The pipe (37) is mounted in the lower passageway (34), extends into the lower chamber of the chamber (35) and mounted slidably through the head disk (39). The high-pressure air from a high-pressure air source connected to the inlet passageway (31) may flow through the pipe (37) to the lower chamber to lift up the head disk (39).

Figure 2D:
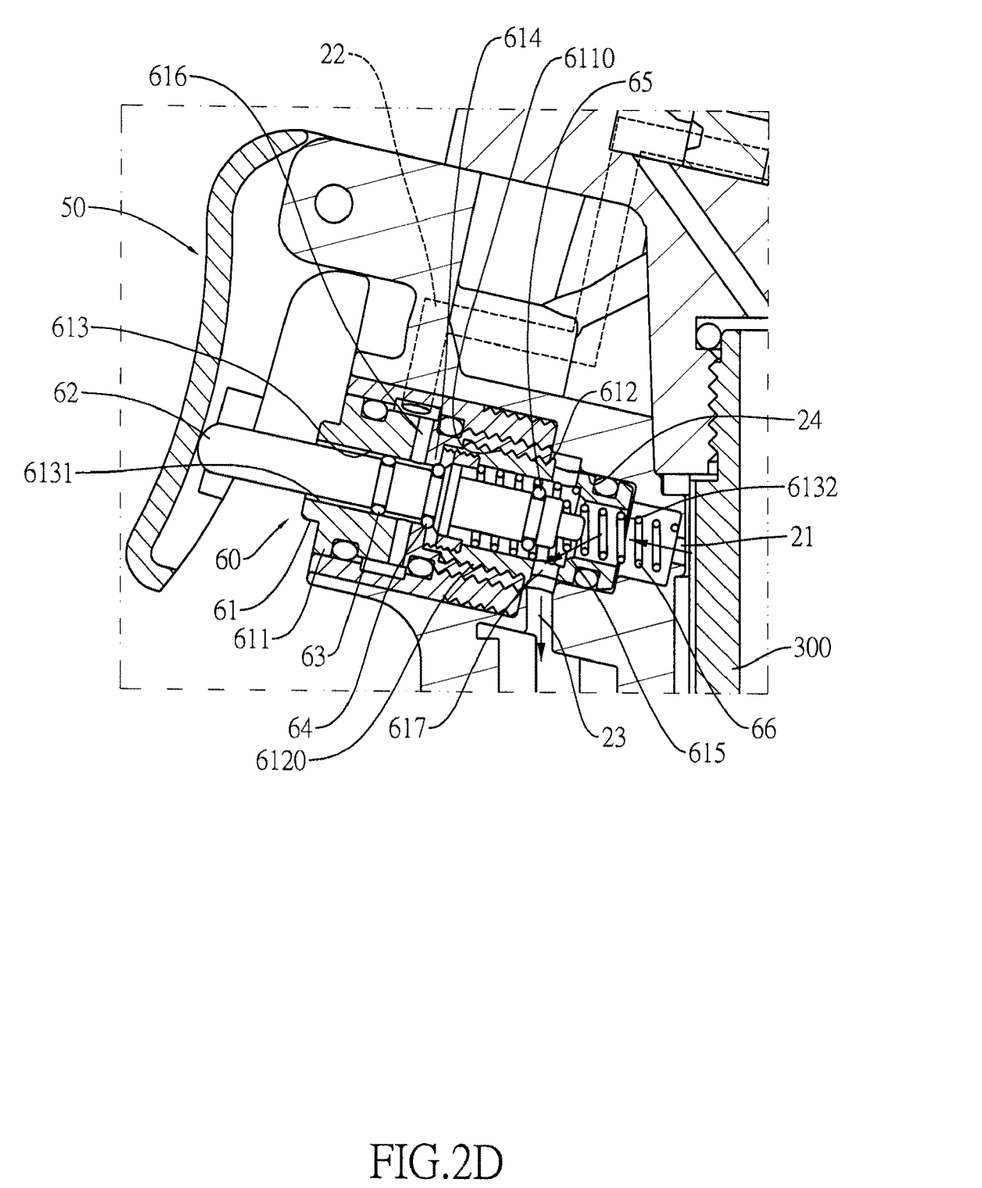
FIG. 2D is a further enlarged cross sectional side view further aimed at the trigger device in FIG. 2C.
Figure 3A:
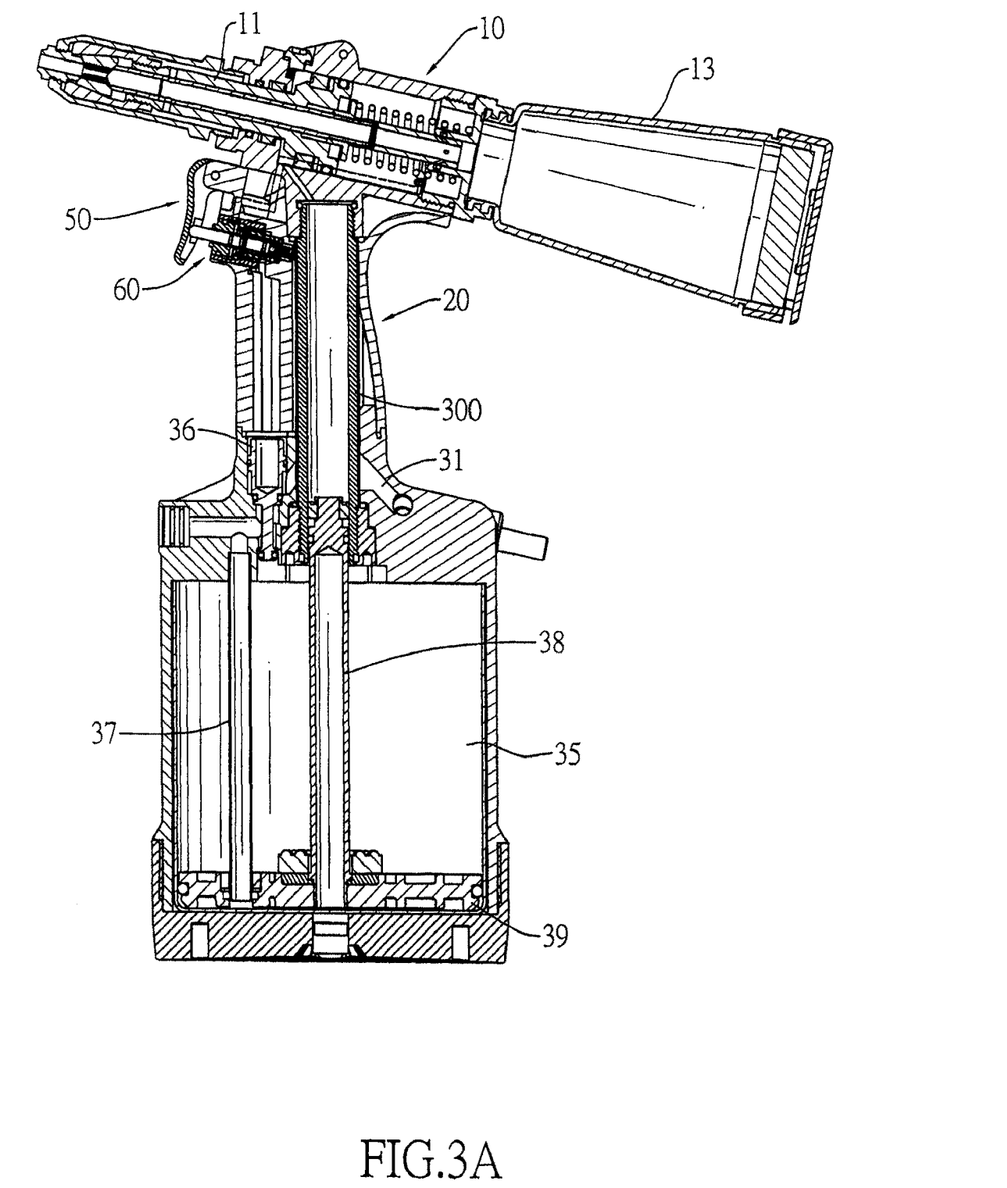
FIG. 3A is a cross sectional side view of the rivet gun in FIG. 1 with the trigger device and pneumatic cylinder, wherein the trigger device is triggered to a first step.
Figure 3B:
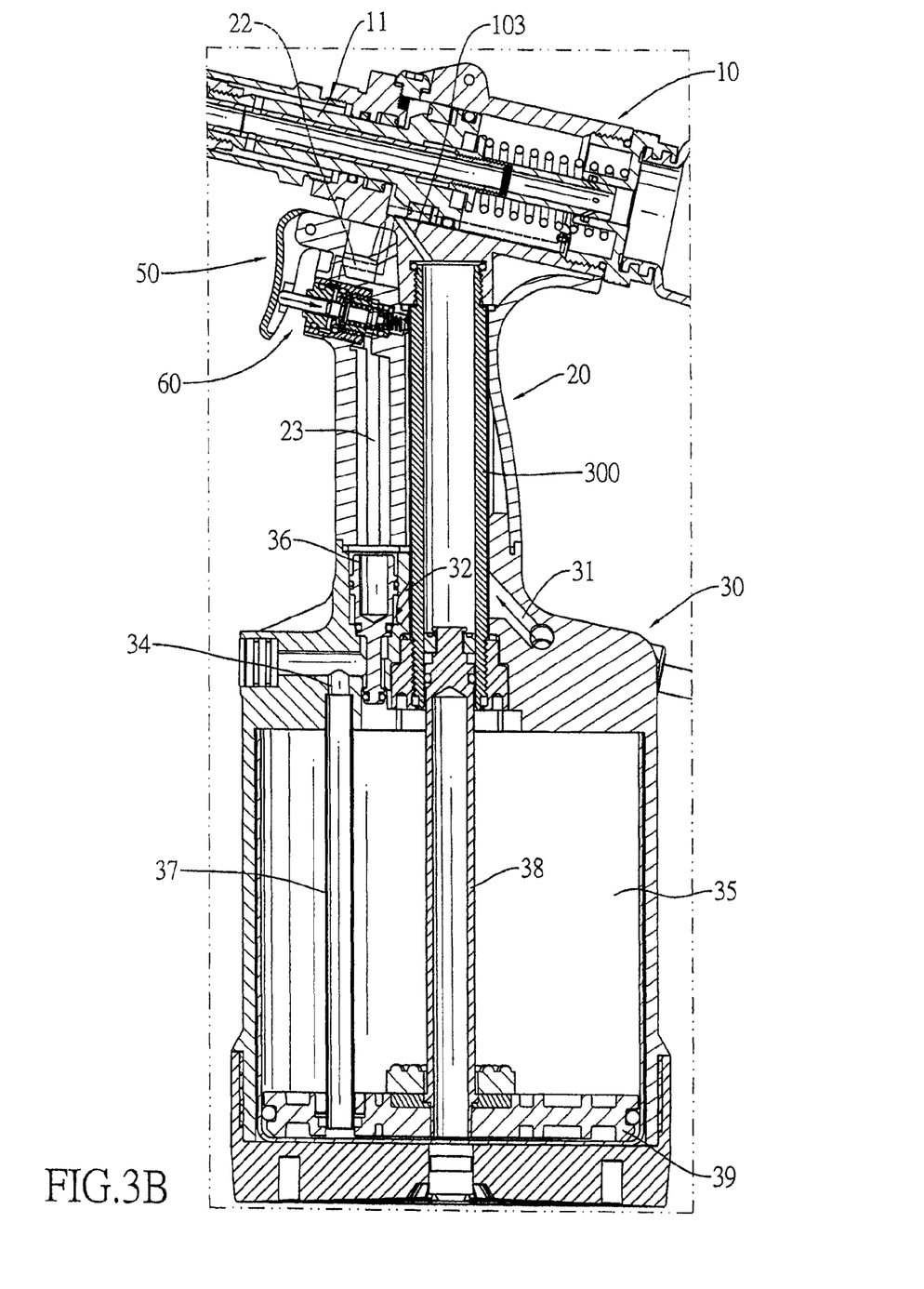
FIG. 3B is an enlarged cross sectional side view of FIG. 3A.
Figure 3C:
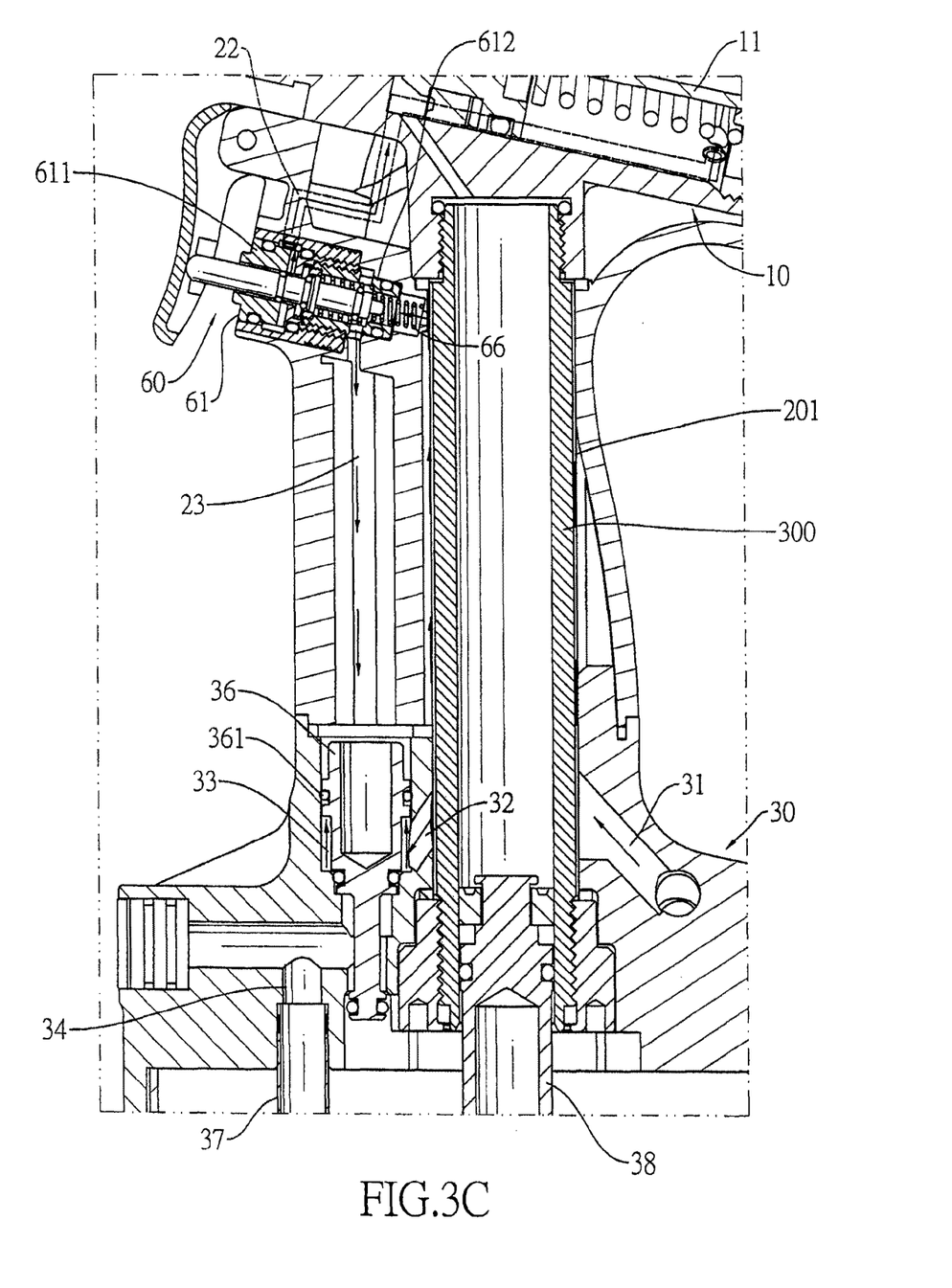
FIG. 3C is a further enlarged cross sectional side view aimed at the handle in FIG. 3B.
Figure 3D:
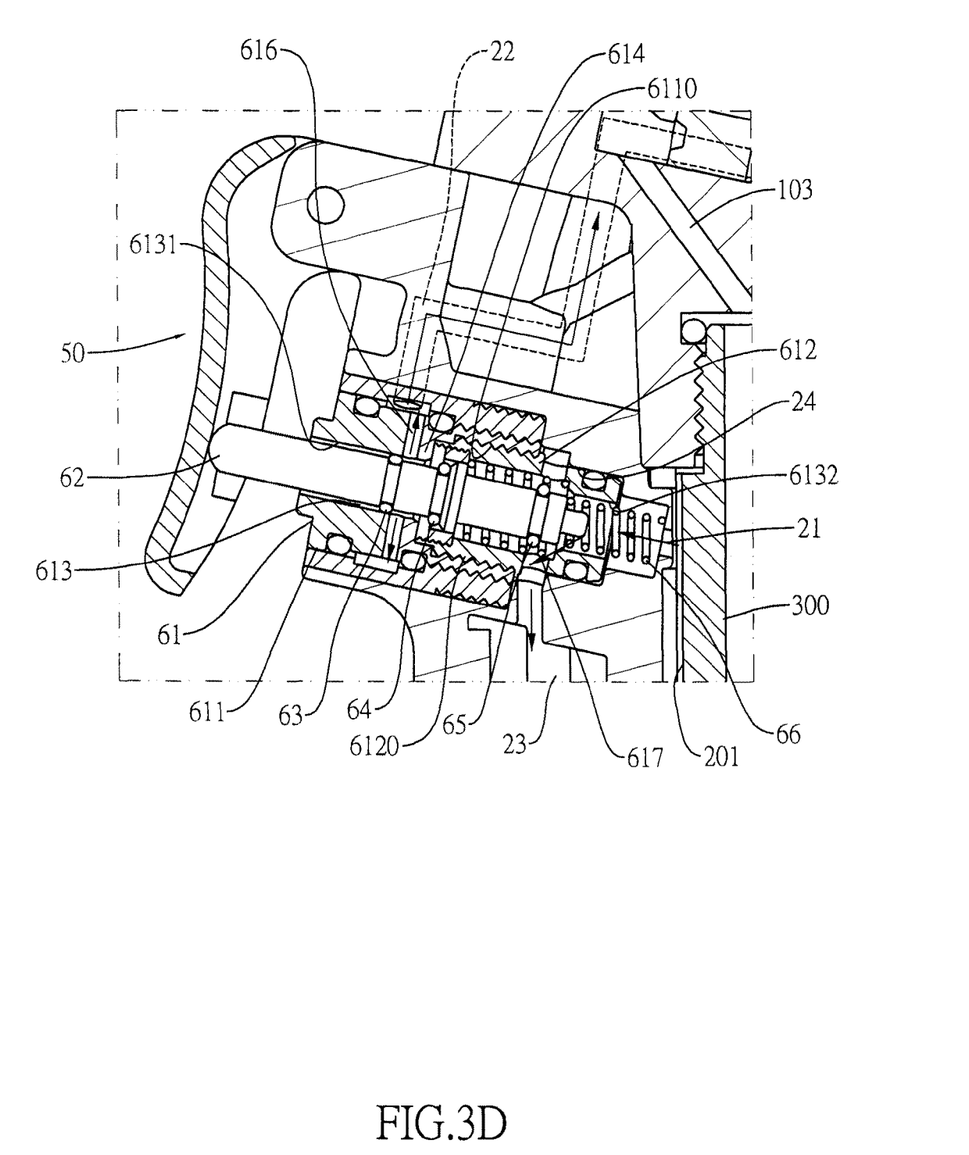
FIG. 3D is a further enlarged cross sectional side view further aimed at the trigger device in FIG. 3C.
Figure 4A:
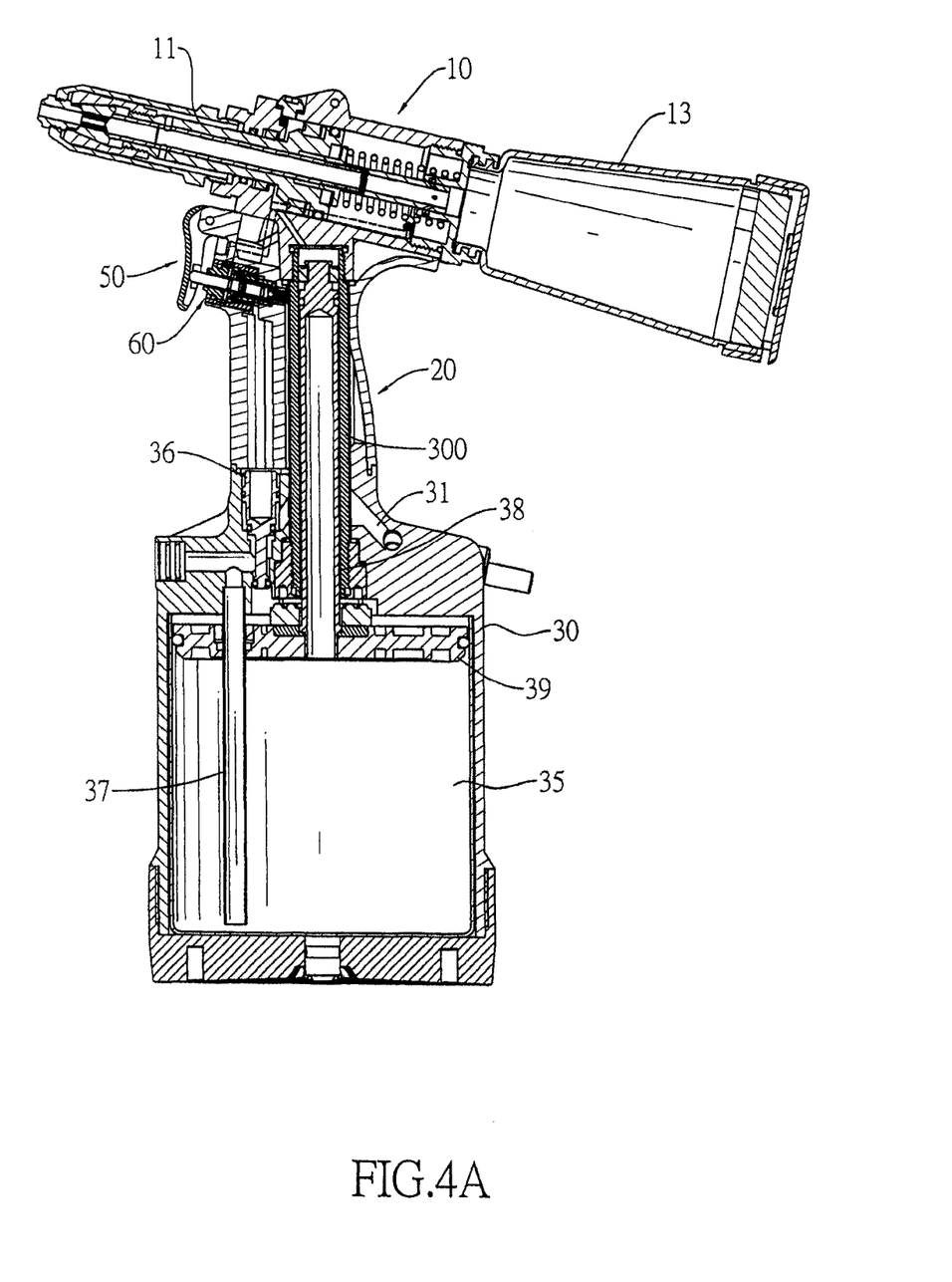
FIG. 4A is a cross sectional side view of the rivet gun in FIG. 1 with the trigger device and pneumatic cylinder, wherein the trigger device is triggered to a second step.
Figure 4B:
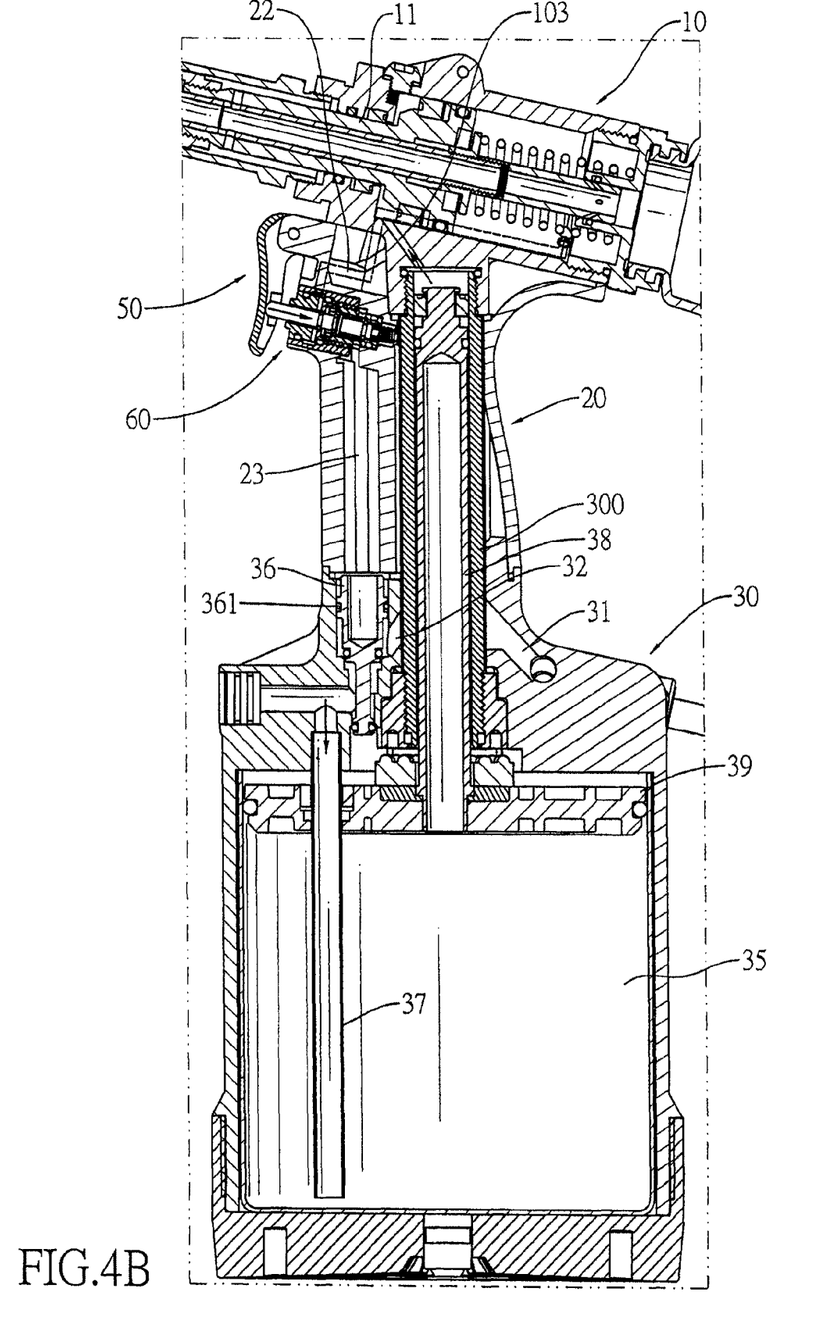
FIG. 4B is an enlarged cross sectional side view of FIG. 4A.
Figure 4C:
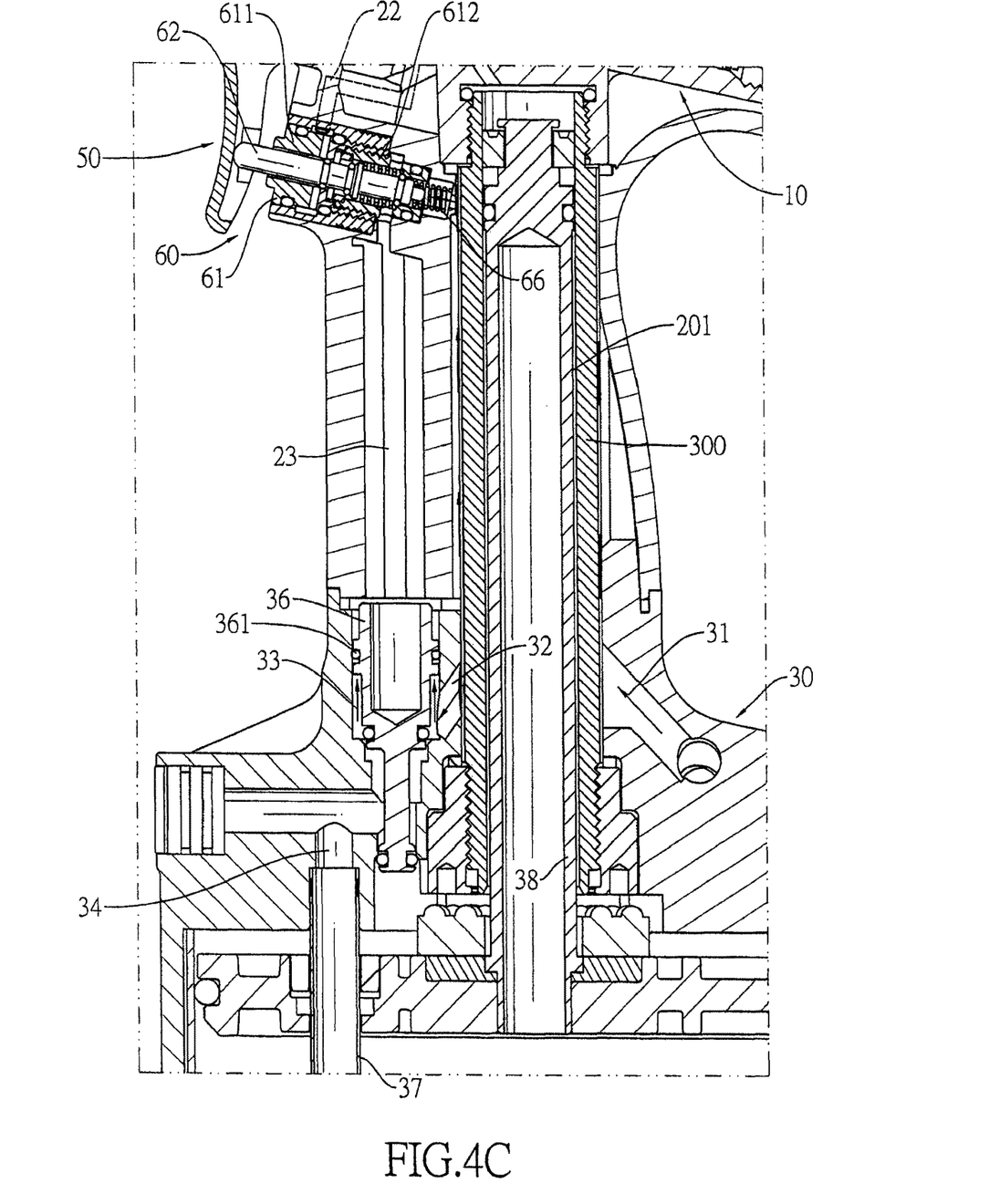
FIG. 4C is a further enlarged cross sectional side view aimed at the handle in FIG. 4B.
Figure 4D:
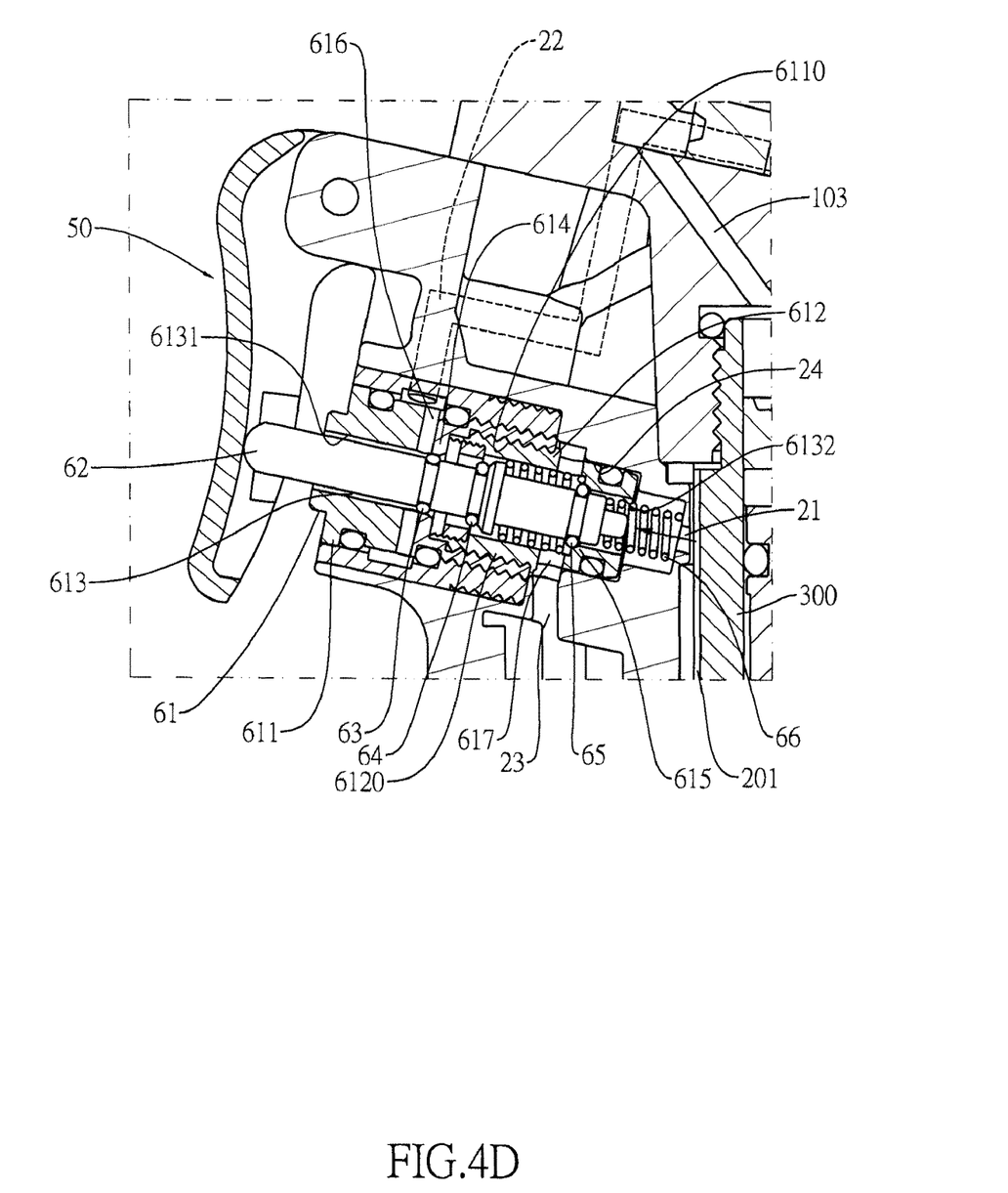
FIG. 4D is a further enlarged cross sectional side view further aimed at the trigger device in FIG. 4C.

With further reference to FIG. 2D, the trigger device is mounted on the handle (20) and comprises an inlet channel (21), an outlet channel (22), a valve-driving channel (23), a space (24), a trigger member (50) and a two-step pressing assembly (60). Furthermore, the internal cavity (33), lower passageway (34) and control valve (36) may be deemed a part of the trigger device.

The inlet channel (21) is defined in the handle (20) and communicates with the central hole (201) and the central aperture.

The outlet channel (22) is defined through the handle (20) and communicates with the outlet hole (101) of the barrel (10).

The valve-driving channel (23) is defined longitudinally in the handle (20) and communicates with the internal cavity (33) of the pneumatic cylinder (30).

The space (24) is defined transversely in the handle (20), communicates with the inlet channel (21), the outlet channel (22) and the valve-driving channel (23) and has an inner surface.

The trigger member (50) is mounted pivotally on the handle (20) and is aligned with the space (24).

The two-step pressing assembly (60) is mounted securely in the space (24) of the handle (20) to form a rivet gun handle assembly, is selectively activated by the trigger member (50), selectively communicates with the inlet channel (21), the outlet channel (22) and communicates with the valve-driving channel (23). The two-step pressing assembly (60) has a tube assembly (61), a control shaft (62), a front sealing ring (64), a rear sealing ring (65) and a spring (66) and may further have an outside sealing ring (63).

The tube assembly (61) may be assembled by a front sleeve (611) and a rear sleeve (612), is mounted in the space (24) and has a mounting hole (613), an outlet bore (616), a valve bore (617), a front shoulder (614) and a rear shoulder (65). The rear sleeve (612) is mounted securely in the front sleeve (611) by an inner thread (6110) and an outer thread (6120) formed respectively on the front and rear sleeves (611, 612) and engaged with each other. The mounting hole (613) is defined axially through the tube assembly (61), may be defined through the front sleeve (611) and the rear sleeve (612) and has a front open end (6131), a rear open end (6132) and an inner surface. The outlet bore (616) is defined radially in the tube assembly (61), may be defined in the front sleeve (611) and communicates with the mounting hole (613) and the outlet channel (22). The valve bore (617) is defined radially in the tube assembly (61), may be defined in the rear sleeve (612) and communicates with the mounting hole (613) and the valve-driving channel (23). The front shoulder (614) is annular, is formed on and radially protrudes inward from the inner surface of the mounting hole (613) of the tube assembly (61) and may protrude from the front sleeve (611). The rear shoulder (615) is annular, is formed on and radially protrudes inward from the inner surface of the mounting hole (613) of the tube assembly (61) and may protrude from the rear sleeve (612). Furthermore, the outlet bore (616) may be located between the front open end (6131) of the mounting hole (613)

and the front shoulder (614). The valve bore (617) is located between the front shoulder (614) and the rear shoulder (615).

The control shaft (62) is mounted slidably in the mounting hole (613) and has a front end and a rear end. The front end of the control shaft (62) protrudes out of the front open end (6131) and is selectively pressed by the trigger member (50).

The front seal ring (64) is mounted around the control shaft (62) and selectively contacts the front shoulder (614) hermetically to isolate the rear open end (6132) from the outlet bore (616) and the outlet channel (22).

The rear sealing ring (65) is mounted around the control shaft (62) and selectively contacts the rear shoulder (615) hermetically to isolate the rear open end (6132) from the valve bore (617) and the valve-driving channel (23).

The outside sealing ring (63) is mounted around the control shaft (62) between the front end and the front sealing ring (64) and hermetically contacts the inner surface of the mounting hole (613) to prevent inside air from leaking out of the handle (20).

The spring (66) extends through the rear open end (6132) into the mounting hole (613), is mounted between the control shaft (62) and the inner surface of the space (24) to bias the control shaft (62) at an protruding position making the front sealing ring (64) hermetically abut the front shoulder (614) to block the outlet bore (616).

The operation of the rivet gun has three acts as follows.

1. First act: With reference to FIGS. 2A to 2C, when the trigger member (50) is not pulled, the outlet bore (616) is sealed to prevent the high-pressure air of the high-pressure air source from flowing into the barrel (10) to pull the core pin. However, the high-pressure air still flows in turn through the inlet passageway (31), the central aperture and the central hole (201). Then the high-pressure air flows into the inlet channel (21) and the bypass passageway (32) simultaneously. The air into the inlet channel (21) flows in turn through the valve bore (617), the valve-driving (23) and the upper cavity of the internal cavity (33). The air into the bypass passageway (32) further flows into to the lower cavity of the internal cavity (33). The air in the lower cavity and air in the upper cavity have same pressure so that the control valve (36) would not move and stays stably at a lower position to hermetically isolate the lower passageway (34) from the internal cavity (33).

2. Second act: With reference to FIGS. 1A, 1B and 3A to 3D, when the trigger member (50) is pulled halfway at a first step, the control shaft (32) moves towards the rear open end (6132) of the mounting hole (613) of the tube assembly (61). The front sealing ring (64) separates from the front shoulder (614) to allow the outlet bore (616) to communicate with the rear open end (6132) of the mounting hole (613). The high-pressure air flows in turn through the inlet passageway (31), the central aperture, the central hole (201), the inlet channel (21), the outlet bore (616), the outlet channel (21) and finally into the barrel (10) to eject the core pin out of the barrel (10) into the collector (13). Also, the high-pressure air flows in turn through the valve bore (617), the valve-driving (23) and the upper cavity of the internal cavity (33). The upper and lower cavity of the internal cavity (33) have the same air pressure so that the control valve (36) still stays stably at the lower position to hermetically isolate the lower passageway (34) from the internal cavity (33).

3. Third act: With reference to FIGS. 4A to 4D, when the trigger member (50) is further pulled completely, the rear sealing ring (65) hermetically contacts the rear shoulder (615) to isolate the valve bore (617) from the rear open end (632) of the mounting hole (613) and to isolate the outlet bore (616) from the rear open end (6132) of the mounting hole (613). Therefore, the air from the high-pressure air source cannot flow into the valve-driving channel (23) through the inlet channel (21). The air of the high-pressure air source flows in turn through the inlet passageway (31), the bypass passageway (32) and the lower cavity of the internal cavity (33). The air pressure of the lower cavity is the same as that of the high-pressure air source and is larger than the that of the upper cavity so that the control valve (36) is moved upwards to allow the lower passageway (34) to communicate with the internal cavity (33). The high-pressure then flows from the internal cavity (33) into the lower chamber of the chamber (35) to drive the head disk (39) and the piston (38) to move upwards. Then the pneumatic cylinder (30) drives the vise assembly in the barrel (10) to pull the core pin.

The rivet gun outputs the air of the high-pressure air source only when the trigger device is pulled completely at the second step. Therefore, the rivet gun with the trigger device saves the high-pressure air and prevents the noise caused by the outputting air.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A trigger device adapted to be mounted in a rivet gun that has a barrel, a handle and a pneumatic cylinder, the trigger device comprising:
    an inlet channel adapted to be formed in the handle and the pneumatic cylinder;
    an outlet channel adapted to be formed through the handle;
    a valve-driving channel adapted to be formed longitudinally in the handle and communicate with the pneumatic cylinder;
    a space adapted to be formed transversely in the handle, communicating with the inlet channel, the outlet channel and the valve-driving channel and having an inner surface;
    a trigger member adapted to be mounted pivotally on the handle and being aligned with the space; and
    a two-step pressing assembly mounted securely in the space, selectively activated by the trigger member, selectively communicating with the inlet channel, the outlet channel, communicating with the valve-driving channel and having
    a tube assembly mounted in the space and having a mounting hole defined axially through the tube assembly and having a front open end, a rear open end and an inner surface;
    an outlet bore defined radially in the tube assembly and communicating with the mounting hole and the outlet channel;
    a valve bore defined radially in the tube assembly and communicating with the mounting hole and the valve-driving channel;
    a front shoulder formed on and radially protruding inward from the inner surface of the mounting hole of the tube assembly; and
    a rear shoulder formed on and radially protruding inward from the inner surface of the mounting hole of the tube assembly;

a control shaft mounted slidably in the mounting hole and having
a front end protruding out of the front open end and selectively pressed by the trigger member; and
a rear end;
a front sealing ring mounted around the control shaft and selectively contacting the front shoulder hermetically to isolate the rear open end from the outlet bore and the outlet channel;
a rear sealing ring mounted around the control shaft and selectively contacting the rear shoulder hermetically to isolate the rear open end from the valve bore and the valve-driving channel; and
a spring extending through the rear open end into the mounting hole, mounted between the control shaft and the inner surface of the space to bias the control shaft at a protruding position making the front sealing ring hermetically abut the front shoulder to block the outlet bore;
whereby high-pressure air of a high-pressure air source is prevented from flowing into the barrel when the trigger member is not pulled and the control shaft is not moved; the high-pressure air flows in turn through the valve bore and the valve-driving channel and finally flows into the barrel when the trigger member is pulled halfway to move the control shaft towards rear open end of the mounting hole; when the trigger member is further pulled completely, the rear sealing ring hermetically contacts the rear shoulder to isolate the valve bore from the rear open end of the mounting hole and to isolate the outlet bore from the rear open end of the mounting hole so that the high-pressure air of the high-pressure air source cannot flow into the valve-driving channel through the inlet channel.

2. The trigger device as claimed in claim 1, wherein:
the outlet bore is located between the front open end of the mounting hole and the front shoulder; and
the valve bore is located between the front and rear shoulders.

3. The trigger device as claimed in claim 2, wherein the tube assembly has a front sleeve and a rear sleeve mounted securely in the front sleeve.

4. The trigger device as claimed in claim 3, wherein:
the front sleeve has an inner thread formed on the front sleeve; and
the rear sleeve has an outer thread formed on the rear sleeve and engaged with the inner thread.

5. The trigger device as claimed in claim 4, wherein:
the front shoulder protrudes from the front sleeve and the outlet bore is defined in the front sleeve; and
the rear shoulder protrudes from the rear sleeve and the valve bore is defined in the rear shoulder.

6. The trigger device as claimed in claim 5, wherein the two-step pressing assembly further has an outside sealing ring mounted around the control shaft between the front end of the control shaft and the front sealing ring and hermetically contacting the inner surface of the mounting hole.

7. The trigger device as claimed in claim 6 further comprising:
an internal cavity adapted to be formed in the top of the pneumatic cylinder, communicating with the valve-driving channel and having an inner surface;
a lower passageway adapted to be formed in the pneumatic cylinder and communicating with the internal cavity; and
a control valve mounted slidably in the internal cavity, selectively hermetically isolating the internal cavity from the lower passageway and having a sealing ring mounted around the control valve, hermetically contacting the inner surface of the internal cavity and dividing the internal cavity into an upper cavity and a lower cavity.

\* \* \* \* \*